United States Patent
Kraus et al.

(10) Patent No.: US 7,478,518 B2
(45) Date of Patent: Jan. 20, 2009

(54) YIELD MONITOR SYSTEM

(75) Inventors: Timothy J. Kraus, Blakesburg, IA (US); Timothy J. Trelstad, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/408,829

(22) Filed: Apr. 20, 2006

(65) Prior Publication Data
US 2007/0245704 A1    Oct. 25, 2007

(51) Int. Cl.
*A01D 41/127*    (2006.01)
*A01D 46/08*    (2006.01)

(52) U.S. Cl. .................. 56/10.2 R; 100/41; 701/50

(58) Field of Classification Search ............. 56/10.2 R, 56/10.2 C, 10.2 D; 460/1, 4, 6; 701/50; 100/35, 41
See application file for complete search history.

(56) References Cited

U.S. PATENT DOCUMENTS

| | | | | |
|---|---|---|---|---|
| 4,034,543 | A * | 7/1977 | Voth et al. ...................... | 56/341 |
| 5,913,801 | A * | 6/1999 | Bottinger et al. ......... | 56/10.2 R |
| 6,378,276 | B1 * | 4/2002 | Dorge et al. .................. | 53/502 |
| 6,421,990 | B1 * | 7/2002 | Ohlemeyer et al. ...... | 56/10.2 R |
| 6,431,981 | B1 * | 8/2002 | Shinners et al. ................ | 460/6 |
| 6,553,902 | B2 * | 4/2003 | Leupe et al. .................. | 100/45 |
| 6,651,416 | B2 * | 11/2003 | Parker et al. ................... | 56/341 |
| 6,915,736 | B2 * | 7/2005 | Leupe et al. ................... | 100/45 |
| 7,104,191 | B1 * | 9/2006 | Parker et al. ................... | 100/51 |
| 2002/0193928 | A1 * | 12/2002 | Beck ........................... | 701/50 |
| 2003/0106299 | A1 * | 6/2003 | Vogt et al. ..................... | 56/341 |
| 2004/0187468 | A1 | 9/2004 | Krone et al. | |
| 2005/0085283 | A1 * | 4/2005 | Kormann et al. ............... | 460/7 |
| 2006/0124002 | A1 * | 6/2006 | Dubois ........................ | 100/88 |

FOREIGN PATENT DOCUMENTS

WO    WO 01/00005    1/2001

OTHER PUBLICATIONS

Wild et al.; Dec. 13-16, 1994; ASAE; whole document.*

* cited by examiner

*Primary Examiner*—Thomas B Will
*Assistant Examiner*—Mai T Nguyen

(57) ABSTRACT

In a parallelepiped agricultural baler flake transfer events are sensed e.g. by the activation of a pre-compression chamber switch or other means indicating that the pre-compression chamber is full and a signal is sent to the baler control logic. The baler logic records in memory the GPS location of the baler at the time of the flake transfer event. A map is then generated showing the GPS location of each flake transfer event. The average crop quantity per flake is determined e.g. by weighing a finished bale and dividing the bale weight by the number of flakes per bale and programming the information into the baler logic. Finally the crop yield for a given field area is determined in the baler logic by multiplying the average crop quantity per flake by the number of flake events recorded in the given area.

10 Claims, 2 Drawing Sheets

YIELD MONITOR SYSTEM

FIELD OF THE INVENTION

The present invention relates generally to agricultural balers. More particularly, the present invention relates to parallelepiped balers. Specifically, the present invention relates to a method of utilizing the throughput of crop in such a baler to determine crop yield from a given location.

BACKGROUND OF THE INVENTION

Typical balers comprise a frame pulled by a tractor over a field to pick up hay, straw or other crop to be baled and feeding the crop into a baling chamber where it is compressed into bales. One common baler type creates parallelepiped shaped bales that are formed by a plunger which reciprocates inside a baling chamber. When the bales are complete a tying mechanism is actuated to bind the bale before it is ejected from the baler.

Typically the plunger reciprocates in the baling chamber against the crop material when a new charge of crop is introduced into the chamber. Crop is fed into the baler via a crop pick-up assembly located at ground level and a duct communicating between the pick-up assembly and the baling chamber. Crop is typically pre-compressed in the duct prior to introduction into the baling chamber. A stuffer mechanism then transfers the pre-compressed crop into the baling chamber whenever enough crop material is made available in the duct.

There are four basic types of machine configurations possible with the plunger and stuffer combination. The first type has a continuous plunger, i.e. the plunger is gearbox driven and operates continuously, and a continuous stuffer. With this type of baler crop is continuously fed into a pre-compression chamber by e.g. a three cycle feed rake, each successive cycle filling the chamber and the third cycle moving the flake into the baling chamber where the plunger compresses the flake into a bale.

The second type of baler design also has a continuous plunger, but uses an intermittent stuffer. Here crop is fed into the pre-compression chamber to form a flake, the flake is then transferred into the baling chamber via an intermittently operating stuffer and then the plunger compresses the flake into the bale.

The third type of known baler design uses an intermittent plunger i.e. the plunger is not gearbox driven but is driven e.g. hydraulically and the stuffer is driven continuously. With this continuous feeding system there is no pre-compression chamber and the crop is delivered directly into the baling chamber via a feed fork. A switch at the top of the bale chamber activates a plunger cycle when the baling chamber fills with crop and exerts pressure on the switch.

The fourth and last type of known baler configuration also uses an intermittently driven plunger e.g. hydraulically driven, and also uses an intermittent stuffer. This type of system provides the greatest level of flake consistency as to size and density, because under ideal circumstances the intermittent plunger is always in the ready position when the signal is received that the pre-compression chamber is full. When the pre-compression chamber sensor indicates that sufficient crop has entered the pre-compression chamber a signal is sent to the intermittent stuffer which immediately begins to move the flake from the pre-compression chamber into the baling chamber. As the stuffer approaches a predetermined position the plunger movement is started. The result is improved flake consistency. This combination gives the best bale quality by having consistent density from top to bottom (due to the intermittent feed system) and consistent flake sizes (from the intermittent plunger system).

In pending patent application Ser. No. 11/140,637 filed 27 May 2005 and assigned to the assignee of the present application a method is provided for determining the throughput of a parallelepiped agricultural baler. In this method a wait time between when the feed duct (pre-compression chamber) has reached a predetermined density for transfer of crop to the baling chamber and the plunger is in the home position is calculated and displayed to an operator of the baler, thereby allowing the operator to adjust the baler speed to attain maximum throughput. Such a method when used in conjunction with balers of the fourth type described above (intermittent plunger/intermittent stuffer) allows a baler operator to achieve highly consistent bales with respect to bale density and flake size.

It is desirable to measure crop yield as a crop is being baled so that the operator knows how many tons have been harvested from a field and to identify yield variability throughout the field. One proposed method for doing this involves weighing the total mass of a bale (via load cells) after the bale has been formed and correlating the incremental rotation of the star-wheel to field position to estimate crop yield variability. However, this method requires additional load cells and framework which adds to the cost of the baler. Further, incremental measuring wheels must be used to try to estimate the variation in yield as the bale is being formed which results in additional components and expense.

Accordingly, there is a clear need in the art for a method of determining crop yield without adding a great deal of additional structure and cost to the baler.

SUMMARY OF THE INVENTION

In view of the foregoing, it is an object of the invention to provide a means for determining crop yield for a given area in conjunction with the baling of crop using an agricultural baler.

Another object of the invention is the provision of such a means that does not add a great deal of additional structure or cost to the baler.

A further object of the invention is to provide such a means which is compatible with known baling techniques and equipment.

The foregoing and other objects of the invention together with the advantages thereof over the known art which will become apparent from the detailed specification which follows are attained by a method of determining crop yield for a particular location using an agricultural baler equipped with a GPS unit, wherein a quantity of crop material is accumulated to a predetermined density in a fixed volume pre-compression chamber of the baler prior to transfer of the crop material into a baling chamber of the baler, the method comprising the steps of: sensing events of when flakes of crop material are transferred from the pre-compression chamber to the baling chamber; recording the events; recording a GPS location of the baler at the time of each event; creating a map of events using the recorded GPS locations; estimating crop weight, for each flake of crop material; determining crop yield for a particular area on the map using the number of flake events recorded in the area, wherein the number of flake events times the estimated crop volume weight for each flake equals the crop yield for the area.

In general, in a parallelepiped agricultural baler flake transfer events are sensed e.g. by the activation of a pre-compression chamber switch or other means indicating that the pre-compression chamber is full and a signal is sent to the baler control logic. The baler logic records in memory the GPS location of the baler at the time of the flake transfer event. A map is then generated showing the GPS location of each flake transfer event. The average crop quantity per flake is determined e.g. by weighing a finished bale and dividing the bale weight by the number of flakes per bale and programming the information into the baler logic. Finally the crop yield for a given field area is determined in the baler logic by multiplying the average crop quantity per flake by the number of flake events recorded in the given area.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
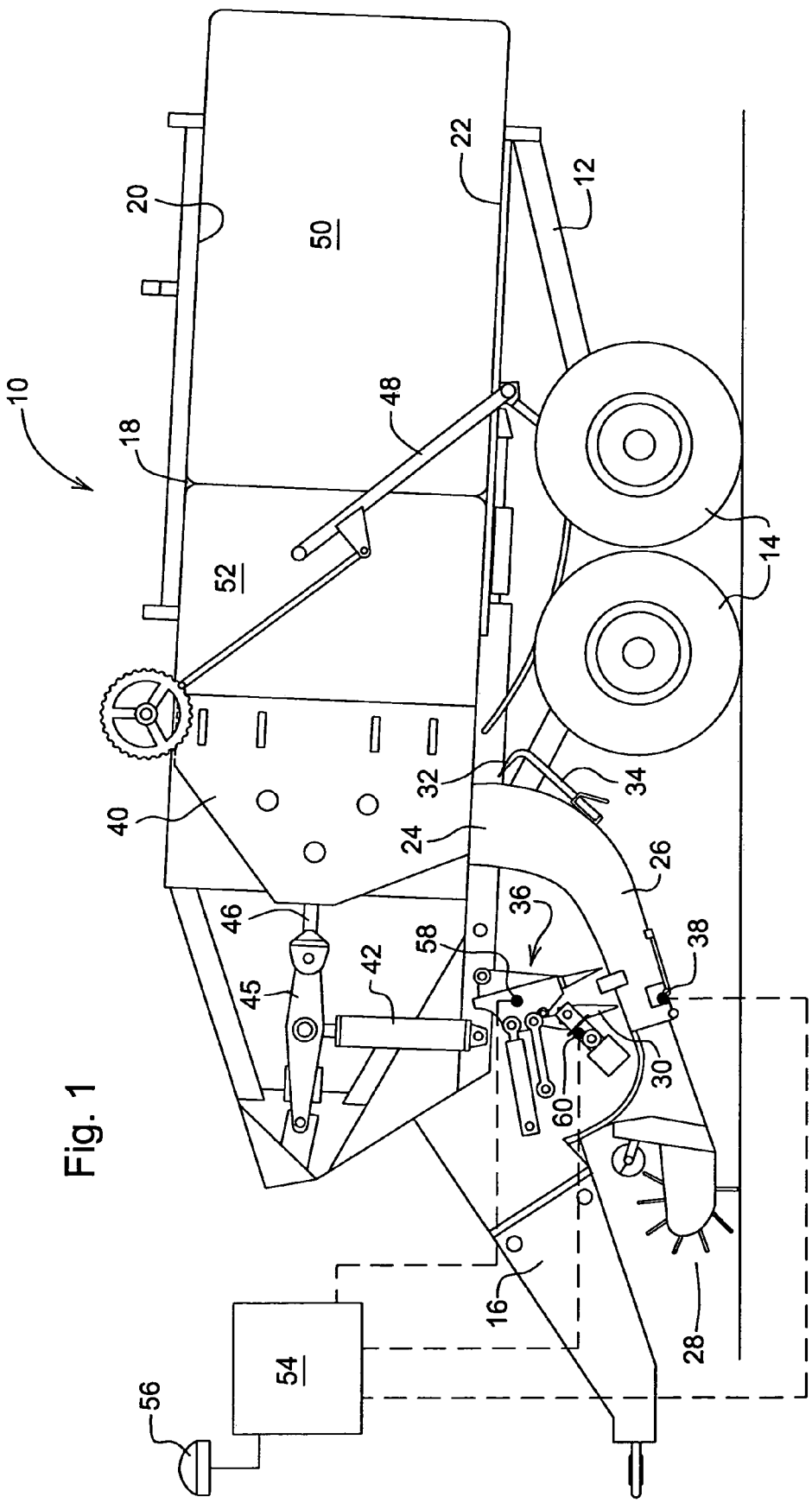
FIG. 1 is a somewhat schematic left side elevational view showing a large parallelepiped baler; and, FIG. 2 is a flow chart showing the steps of the method according to the invention.

With reference now to FIG. 1 it can be seen that a large parallelepiped baler is designated generally by the numeral 10. The baler 10 includes a frame 12 supported on a tandem set of ground wheels 14. A tongue 16 is fixed to and extends forwardly from the frame 12 and is adapted for being attached to a prime mover, such as an agricultural tractor (not shown) equipped with a power take-off shaft for supplying power for driving various driven components of the baler. A baling chamber 18 of rectangular cross section is defined in part by upper and lower walls 20 and 22, respectively, with the lower wall 22 being provided with a crop inlet 24 to which is attached a curved in-feed duct 26 which serves as a pre-compression chamber, as described below. A crop pick-up and center-feed auger assembly 28 is provided ahead of the duct for picking up a windrow of crop from the ground and delivering it to a packer fork assembly 30 which acts to pack crop into the duct 26 until a charge of a pre-selected density has accumulated downstream of fingers 32 of a backstop device 34, the device 34 being pivotally mounted for movement between a blocking position, wherein the fingers 32 project into the duct 26 in the vicinity of the inlet 24, and a feed position, wherein the fingers are withdrawn from the duct 26 to permit the charge of crop material to be stuffed into the baling chamber 18 via the inlet 24 by a stuffer fork assembly 36. Located in a lower front location of the duct 26 is a pre-compression chamber sensor (PCCS) 38 which may take the form of e.g. a pivotally mounted, spring-loaded door that pivots, in response to crop material located in the duct achieving a desired density, to energize electrical control circuitry (not shown) which actuates appropriate drive couplings which first cause the backstop device 34 to rotate so as to withdraw the fingers 32 from their blocking position shown in FIG. 1, and then to actuate the stuffer fork assembly 36 such that forks thereof sweep through the duct 26 and move the charge of material into the baling chamber 18. Once the charge of crop material is stuffed into the baling chamber 18, a plunger mechanism 40, which is mounted to a forward location of the frame 12 is operated, in controlled sequence after operation of the feeder fork assembly 36, to move the material rearwardly in the chamber 18 where it is compacted into a column. The plunger is driven by an extensible and retractable hydraulic actuator 42 that is connected for oscillating a crank 45 coupled to the plunger 40 by a connecting link 46. Upon the column of compressed crop material reaching a pre-selected length, a twine-delivery needle assembly 48, including a plurality of curved needles, is actuated to deliver a plurality of strands of twine respectively to a plurality of knotters (not shown) which act to tie lengths of twine about the pre-selected column length to form a bale 50 that is then ready for discharge, which will occur upon it being forced from the rear end of the chamber 18 by a bale portion 52 as it grows in length upon new charges of crop being stuffed into the chamber.

Since the force to activate the PCCS 38 is proportional to the mass of the crop that has accumulated in the pre-compression chamber 26, crop yield can be "estimated" by using a computer 54 and appropriate global positioning system (GPS) 56 to record baler position in the field each time the PCCS 38 is activated. A map, indicating baler location each time the PCCS 38 is activated, can be used to illustrate variations in crop yield. Total yield can then be calculated by weighing one bale, dividing the bale weight by the number of slices or flakes per bale (equaling slice or flake weight), and summing the weight of the total number of slices or flakes harvested in the field.

Figure 2:
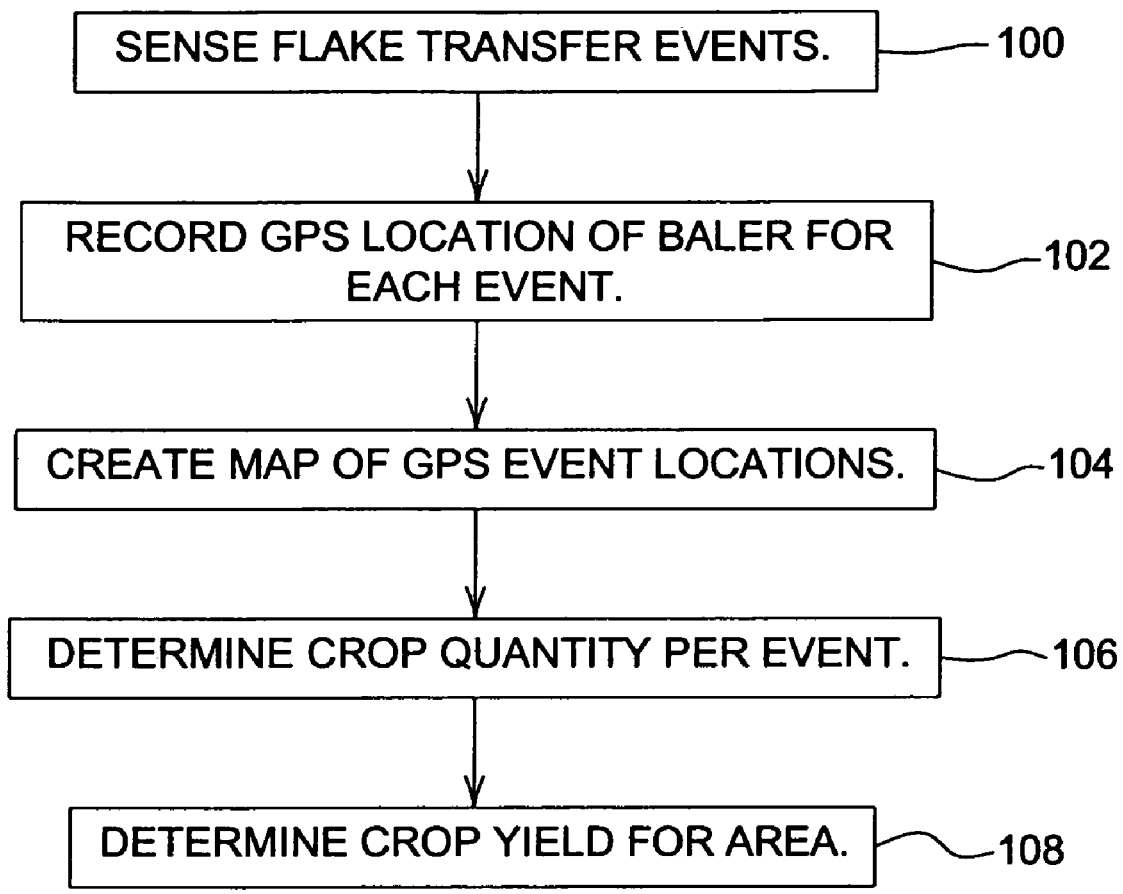

With reference to FIG. 2 the steps of the method of the invention can be seen. At 100 the flake transfer event is sensed i.e. the activation of the PCCS switch indicating that the pre-compression chamber is full is sensed and a signal is sent to the baler control logic. At 102 the baler logic records in memory the GPS location of the baler at the time of the flake transfer event. At 104 a map is generated showing the GPS location of each flake transfer event. At 106 the average crop quantity per flake is determined. As discussed above this can be done by weighing a finished bale and dividing the bale weight by the number of flakes per bale. This information can then be programmed into the baler logic. Finally at 108 the crop yield for a given field area is determined in the baler logic by multiplying the average crop quantity per flake by the number of flake events recorded in the given area.

With reference again to FIG. 1 those having skill in the art will recognize that it is also be possible to measure the mass of crop in the pre-compression chamber by monitoring one or more sensors 58 associated with the stuffer system, for example by measuring the force needed to convey the crop into the main baling chamber. This could be done by several means including but not limited to: the use of strain gages placed on the stuffer tines, measuring the hydraulic pressure of the stuffer tine cylinder, and/or measuring the force the crop exerts on the retaining fingers via the use of strain gages. It is also possible to sense the actuation of a mechanical or electromechanical clutch or electric motor associated with the stuffer mechanism to determine when the flake transfer has occurred. Similarly it is possible to determine the flake transfer event by monitoring one or more sensors 60 associated with the packer system. More particularly, a density of crop in the pre-compression chamber indicating that the chamber is full and ready for transfer to the baling chamber can be determined by measuring a pressure drop across the hydraulic packer motor, by strain gages associated with the packer fork, or by the use of other sensors associated with the packer system.

It should be noted that purely mechanically driven balers cannot utilize this approach very effectively because the timing of the stuffer tines and the plunger stroke are not synchronized. Often with pure mechanically driven balers, the pre-compression chamber is "full" when the main plunger is in mid-stroke. When this occurs the pre-compression chamber cannot be emptied until the plunger returns to its retraced position. Consequently, the pre-compression chamber is "over-filled" Because a pure mechanical system does not insure a uniform fill capacity of the pre-compression chamber, it cannot be used effectively to estimate yield.

However, with the hydraulic baler design (intermittent plunger/intermittent stuffer), movement of the main plunger and the pre-compression chamber stuffer tines are synchronized insuring that the pre-compression chamber is, under normal operating conditions and within the capacity of the machine, never "over-filled" as a result of waiting for the plunger to return to the retracted position. This insures that a uniform mass of material is accumulated in the pre-compression chamber each time the PCCS is activated (i.e. every slice or flake of the bale is equal).

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A method of determining crop yield for a particular location using an agricultural baler equipped with a GPS unit, wherein a flake of crop material is accumulated to a predetermined density in a fixed volume pre-compression chamber of the baler prior to transfer of the crop material into a baling chamber of the baler, the method comprising the steps of:

sensing flake events, the flake events occuring when flakes of crop material are transferred from the pre-compression chamber to the baling chamber;
recording the flake events;
recording a GPS location of the baler at the time of each flake event;
creating a map of flake events using the recorded GPS locations;
estimating crop weight, for each flake of crop material;
determining crop yield for a particular area on the map using a number of flake events recorded in the area, wherein the number of flake events times the estimated crop weight for each flake equals the crop yield for the area.

2. A method of determining crop yield as set forth in claim 1 wherein a pre-compression chamber switch is provided for sensing when the pre-compression chamber is full, activation of the pre-compression chamber switch serving as a sensed flake event.

3. A method of determining crop yield as set forth in claim 1 comprising the further step of providing at least one strain gages on at least one stuffer tine of the baler to serve as sensors for sensing a flake event.

4. A method of determining crop yield as set forth in claim 1 comprising the further step of pre-selecting a hydraulic pressure of a stuffer tine cylinder of the baler to indicate to the baler logic that a flake event has occurred.

5. A method of determining crop yield as set forth in claim 1 comprising the further step of pre-selecting a force exerted by the crop on crop retaining fingers in the baler to indicate to the baler logic that a flake event has occurred.

6. A method of determining crop yield as set forth in claim 1 comprising the further step of sensing the actuation of a mechanical clutch associated with a stuffer mechanism of the baler to indicate to the baler logic that a flake event has occurred.

7. A method of determining crop yield as set forth in claim 1 comprising the further step of sensing the actuation of an electrically actuated device associated with a stuffer mechanism of the baler to indicate to the baler logic that a flake event has occurred.

8. A method of determining crop yield as set forth in claim 1 wherein the estimated crop volume weight for each flake of crop material is determined by weighing a finished bale and dividing the weight of the bale by a number of flakes per bale.

9. A method of determining crop yield as set forth in claim 1 comprising the further step of providing at least one sensor associated with a packer mechanism of the baler to indicate to the baler logic that a flake event has occurred.

10. A method of determining crop yield as set forth in claim 9 comprising the further step of using the at least one sensor for measuring a pressure drop across a hydraulic motor driving the packer mechanism.

* * * * *